Nov. 20, 1934.  C. H. MILLER, JR  1,981,825

VALVE

Filed June 23, 1931

Inventor

Clinton H. Miller, Jr.

By

W. E. Currie, Attorney

Patented Nov. 20, 1934

1,981,825

UNITED STATES PATENT OFFICE 1,981,825

VALVE

Clinton H. Miller, Jr., Elizabeth, N. J., assignor to Standard Oil Development Company, a corporation of Delaware Application June 23, 1931, Serial No. 546,209

1 Claim. (Cl. 251—155)

This invention relates to improvements in valve structure. The invention will be fully understood from the following description taken in connection with the accompanying drawing in which latter—

Figure 1:
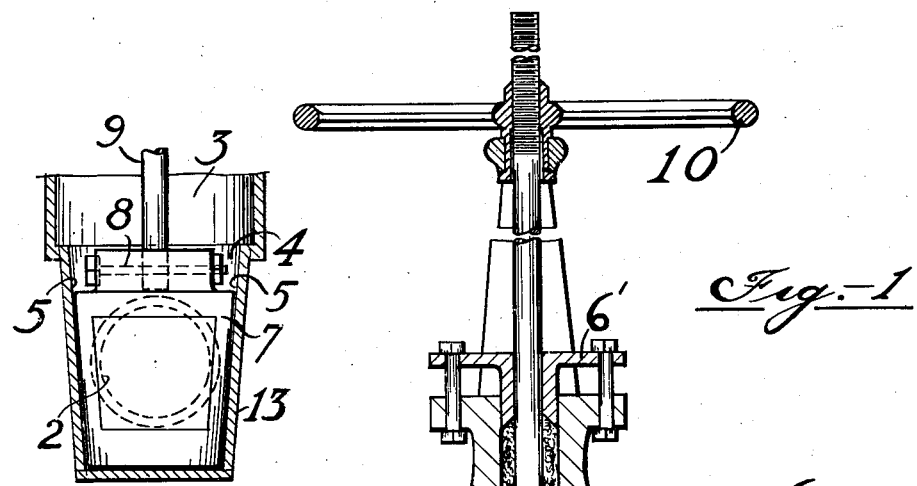
Figure 2:
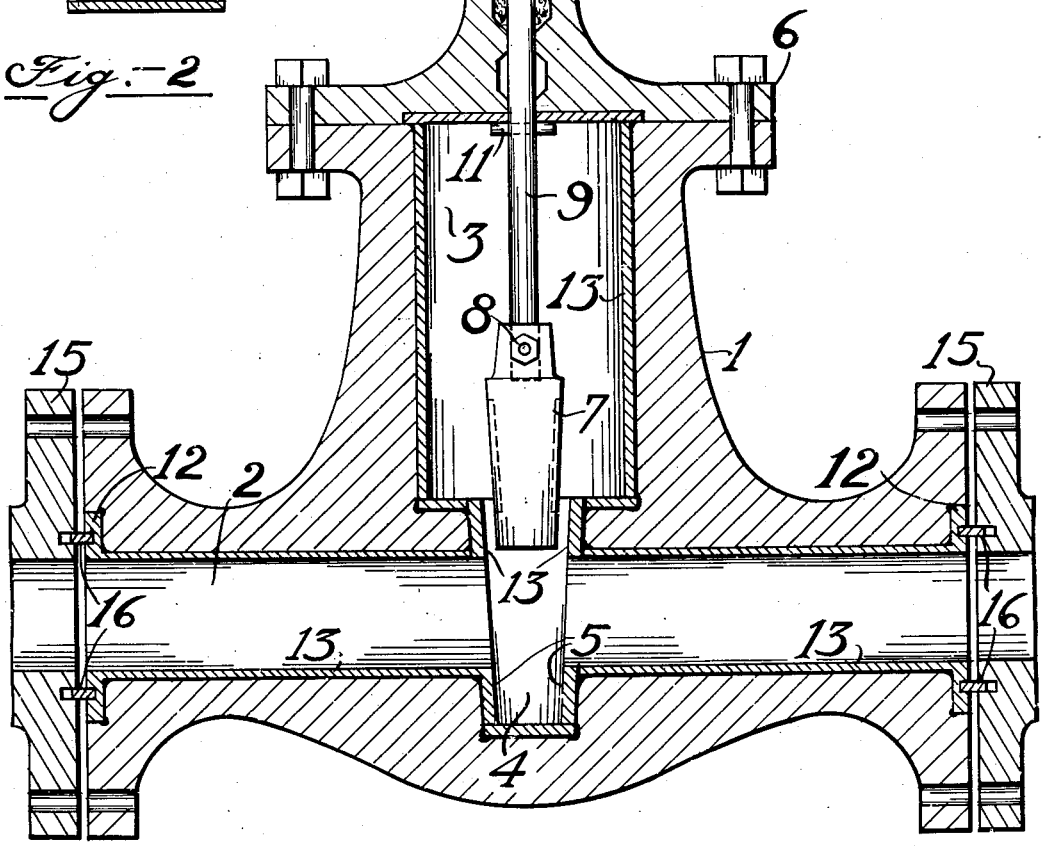

Fig. 1 is a longitudinal sectional view through a preferred form of valve structure with the valve shown in end view, and Fig. 2 is a detail view of the portion of liner constituting the valve seat with the valve shown in side elevation.

Referring particularly to the drawing, reference numeral 1 designates a housing having a passageway 2 communicating with a valve chamber 3. The valve chamber has a valve pocket 4 disposed transversely of the passageway and is provided with seats 5. The housing is formed of iron, steel or other suitable metal possessing sufficient strength for the purpose intended but which ordinarily lacks corrosion resistant properties. For example, the housing may be corroded by petroleum oil containing chemicals used in the refining of the oil. The upper portion of the valve chamber is closed by a cap or bonnet 6 having a stuffing box 6' adapted to receive a valve stem 9. The valve comprises a wedge disc gate 7 which is secured by a flexible connection at 8 to the valve stem 9. A hand wheel 10 is provided for actuating the valve. The valve stem 9 is provided with a stop 11 to limit upward movement of the gate so that a portion of the gate is maintained in the valve pocket when the gate is in its open position or by length of screw thread on the stem. As a consequence of this structure full opening of the passageway is permitted, but by keeping the bottom edge of the gate engaged between the seats 5, the gate is always maintained in position to seat against the valve pocket and thereby the necessity for ribs or guides for the gate is eliminated. The gate has a depressed center area on both faces sufficient to form a rim at the outer circular edge and permit machining or grinding to form a seat. The gate and the stem are made of a relatively non-corrodible material. Each end wall of the housing is provided with an annular recess which faces the passageway.

A liner 13 of substantially non-corrodible material is disposed within the passageway 2, valve chamber 3, valve pocket 4 and recesses 12. The portions of the liner which line the passageway of the housing and the valve chamber can be formed from seamless tubing of proper size or from formed and welded parts. The portion of the liner which forms the valve pocket is made sufficiently thick to permit machining or grinding after fabrication so as to make a seat or seal having the proper angle to form a wedge seat 5 for the valve gate 7. The valve pocket 4 is formed of sufficient depth to permit the valve gate 7 to be moved outwardly into it sufficiently to compensate for wear of the faces of the seat by the valve gate. A portion of the liner extends into the annular recesses 12 at the ends of the housing. This portion of the liner is made relatively thick to permit machining or grinding to form ring joint, serrated, raised face, tongue and groove or similar connections. In the embodiment illustrated the housing is connected to a pipe 15 by means of a ring joint which includes an annular ring 16 which engages in a recess formed in the liner and in a recess formed in the end of the pipe 15.

The liner can be made by fabricating formed segments or parts and joining them by electric or gas welding or brazing, or by casting a thin walled formed shell or body in a mold. The fabricated or cast liner will then be placed in a mold and will act as a core about which will be cast in the usual manner the metal for forming the housing. The liner and housing become an integral body adhering to each other by fusion which takes place in the casting of the outer metal. The liner is preferably formed of such non-corrodible metal as alloy steel containing chromium, chromium and nickel, or non-ferrous metals containing copper and nickel, or commercially pure nickel or corrosion resisting alloys, the selection of which will be governed by the conditions of service for which the valve is intended.

Various changes may be made within the scope of the appended claim in which it is desired to claim all novelty inherent in the invention as broadly as the prior art permits.

I claim:

In a valve structure, a liner formed with a passageway communicating with a valve chamber having a valve pocket disposed transversely of the passageway, a housing cast around and adhering to the liner by fusion, and a valve member movable to seat against the side walls of the valve pocket.

CLINTON H. MILLER, JR.